(12) United States Patent
Fürst

(10) Patent No.: US 11,524,815 B2
(45) Date of Patent: Dec. 13, 2022

(54) BAG FOR LOOSE MATERIAL

(71) Applicant: Starlinger & Co Gesellschaft m.B.H., Vienna (AT)

(72) Inventor: Herbert Fürst, Bad Vöslau (AT)

(73) Assignee: STARLINGER & CO GESELLSCHAFT M.B.H., Vienna (AT)

(*) Notice: Subject to any disclaimer, the term of this patent is extended or adjusted under 35 U.S.C. 154(b) by 0 days.

(21) Appl. No.: 16/767,660

(22) PCT Filed: Nov. 12, 2018

(86) PCT No.: PCT/EP2018/080923
§ 371 (c)(1),
(2) Date: May 28, 2020

(87) PCT Pub. No.: WO2019/115105
PCT Pub. Date: Jun. 20, 2019

(65) Prior Publication Data
US 2021/0002032 A1    Jan. 7, 2021

(30) Foreign Application Priority Data

Dec. 14, 2017 (EP) .................................. 17207216

(51) Int. Cl.
*B65D 30/24* (2006.01)
*B29C 65/00* (2006.01)
(Continued)

(52) U.S. Cl.
CPC ............ *B65D 31/142* (2013.01); *B29C 66/71* (2013.01); *B29L 2031/7128* (2013.01); *B65D 31/08* (2013.01)

(58) Field of Classification Search
CPC ............................. B65D 31/142; B65D 31/08
(Continued)

(56) References Cited

U.S. PATENT DOCUMENTS 5,823,685 A * 10/1998 Garlichs .............. B65D 31/142
383/211
5,845,995 A 12/1998 Sarlinger Huemer
(Continued)

FOREIGN PATENT DOCUMENTS

DE      8328683 U1 * 11/1983 ......... B65D 75/5894
DE      3336731 A1 *  4/1985 ........... B65D 31/142
(Continued)

OTHER PUBLICATIONS

Machine translation of DE-8328683-U1.*
Machine translation of DE3336731A1.*

*Primary Examiner* — Jes F Pascua
(74) *Attorney, Agent, or Firm* — Workman Nydegger

(57) ABSTRACT

A bag for loose material, wherein the bag is formed from a tubular material, which tubular material is a tubular planar assembly or a flat material connected to form a tube, and has a first and a second open end. Sections of the tubular material of one of the ends are shaped by folding to form a bag bottom. The bag bottom exhibits a first cover sheet and a second cover sheet. The first cover sheet is connected to the bag bottom and extends in a first region of the bag bottom. The second cover sheet is connected to the bag bottom and extends in a second region of the bag bottom. Via the cover sheets, the folded sections of the tubular material are held together in such a way that the bag bottom is sealed.

11 Claims, 4 Drawing Sheets

(51) Int. Cl.
 *B29L 31/00* (2006.01)
 *B65D 30/18* (2006.01)

(58) Field of Classification Search
 USPC ..................................... 383/44–58, 125, 126
 See application file for complete search history.

(56) References Cited

U.S. PATENT DOCUMENTS

2009/0324144 A1* 12/2009 Edlinger ............. B65B 69/0008
                                                                 383/207
2019/0202603 A1*  7/2019 Vilain .................... B65D 31/08
2019/0352054 A1* 11/2019 Vivolo ................... B65D 29/00

FOREIGN PATENT DOCUMENTS

| DE | 3941300 | 6/1991 | |
| DE | 10352109 A1 * | 6/2005 | ............. B65D 31/08 |
| EP | 0285940 A2 * | 10/1988 | ........... B65D 31/142 |
| EP | 0758992 | 2/1997 | |
| EP | 2441574 | 4/2012 | |
| EP | 2857322 | 4/2015 | |
| EP | 3017940 | 5/2016 | |
| WO | WO-0100496 A1 * | 1/2001 | ........... B65D 31/142 |
| WO | WO-2012103560 A1 * | 8/2012 | ............. B65D 33/10 |
| WO | WO-2017198964 A1 * | 11/2017 | |

* cited by examiner

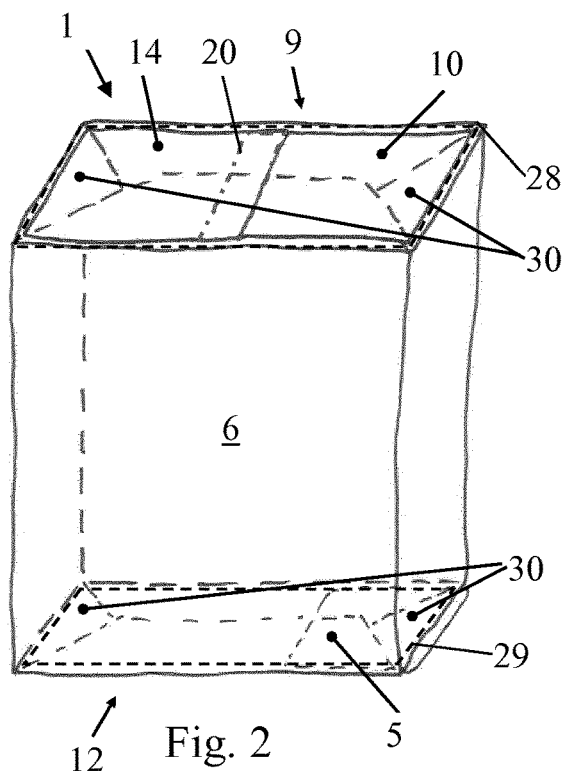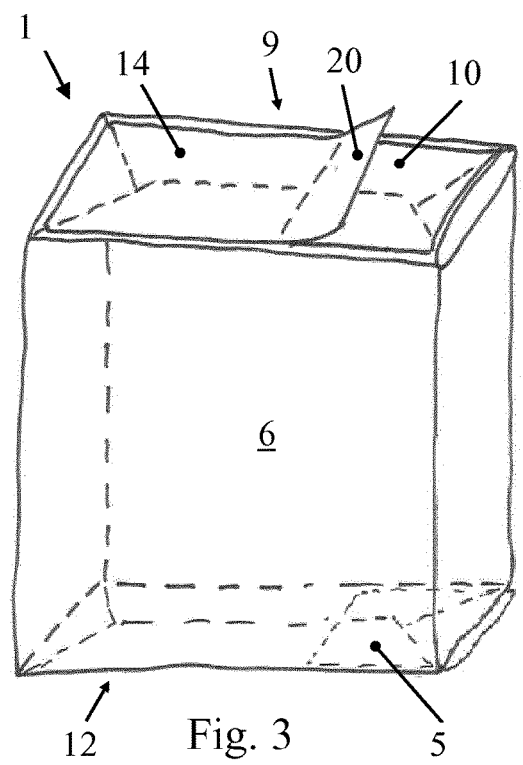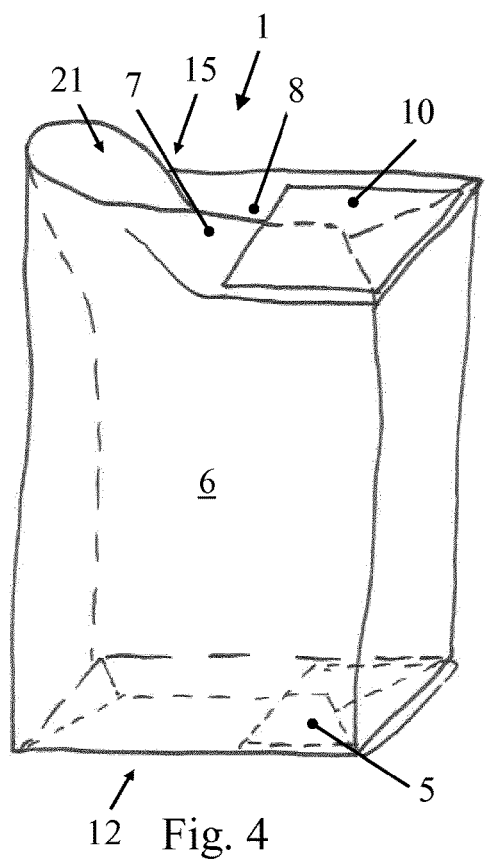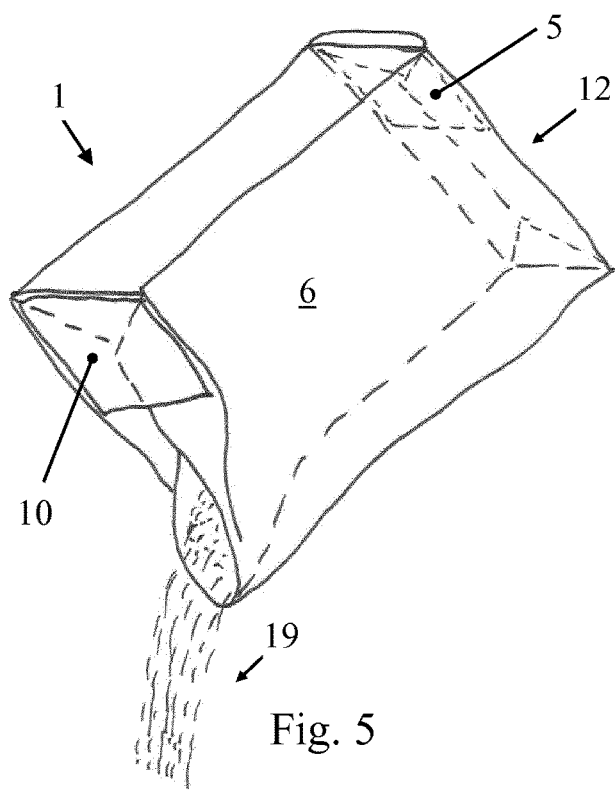

BAG FOR LOOSE MATERIAL

The invention relates to a bag for loose material, a method of producing a bag for loose material, and a device for producing a bag for loose material.

Due to their high strength and resistance to moisture, bags made of fabrics of plastic tapes, in particular fabrics of polyolefin or polyester tapes, have become established as a popular packaging material. Usually, a tubular planar assembly, in particular a tubular circular-woven fabric, or a flat fabric connected to form a tube is used as a starting material for such bags, wherein sections of the fabric of at least one open end are shaped by folding to form a bag bottom. For the transport of loose material, bags are mostly used which are sealed on both sides by a bag bottom formed at the open ends of the tubular fabric. In this case, either pillow-shaped or box-shaped bags are formed, depending on the embodiment of the bag bottoms. For filling box-shaped bags sealed on two sides, valves formed by valve patches been proved their worth, since such a valve closes automatically after the filling of the bag. The valve patch is introduced into the bag bottom when the bag bottom is being folded. As a reinforcement of the bag bottoms, the bags additionally exhibit one cover sheet per bag bottom, which is flatly applied to the bag bottoms. Box-shaped bags sealed on two sides and comprising a valve—also referred to as block bottom valve bags—and their production are known, for example, from patent specification EP 0 758 992 B1.

So as to gain access to the contents of a bag as described above, it must be opened with a knife or a similar pointed tool such as, e.g., a pair of scissors. However, since knives or similar tools are not always available for opening the bag, other items are often misused in order to open the bag. This, however, can quickly lead to injuries, since the fabric of the bags is able to withstand very high loads in order to prevent cracks and loose material from leaking.

It is the object of the present invention to provide a bag which has a simple construction and can be opened without any additional tool. Furthermore, it is the object of the present invention to provide a method and a device for the production of such a bag.

According to the invention, the present object is achieved by a bag having the features of the characterizing part of claim 1.

The bag according to the invention is formed from a tubular material which is a tubular planar assembly or a flat material connected to form a tube, is formed by a fabric, a nonwoven, a film or paper and has a first and a second open end opposite each other. In the case of a tubular material formed by a fabric, the fabric is advantageously formed from interwoven plastic tapes such as polyolefin or polyester tapes etc., and/or natural fibers such as jute, etc. Advantageously, the tubular material can be welded.

Sections of the tubular material of at least one of the open ends are shaped by folding to form a bag bottom, wherein the bag exhibits one first cover sheet per bag bottom, which is designed for reinforcing the bag bottom. The first cover sheet is connected to the bag bottom and extends in a first region of the bag bottom. The first cover sheet can be formed, for example, by a flat sheet of plastic or paper, nonwoven, a film or a fabric made of plastic and/or natural fibres.

According to the invention, the bag bottom comprises a second cover sheet, wherein the second cover sheet extends in a second region of the bag bottom and is connected to the bag bottom in such a way that it can be detached from the bag bottom. Via the cover sheets, the folded sections of the tubular material are held together in such a way that the bag bottom is sealed. The second cover sheet can be formed, for example, by a flat sheet of plastic or paper, a film, a nonwoven or again from a fabric made of plastic and/or natural fibres.

Advantageously, the connection between the second cover sheet and the bag bottom is obtained by welding or gluing the second cover sheet to the tubular material of the bag bottom, wherein the adhesion of the glue or the weld must be chosen such that the second cover sheet is detachable from the bag bottom, but still sticks to the tubular material to a sufficient degree so that unintentional and inadvertent loosening is prevented.

Advantageously, also the first cover sheet is glued or welded to the bag bottom, wherein the adhesion of the glue or the weld must be so strong that the first cover sheet is reliably prevented from becoming loose.

Suitably, a material of the second cover sheet differs from a material of the first cover sheet and/or from the tubular material of the bag. This provides the advantage that, despite the use of an identical adhesive or welding method for connecting the first cover sheet to the tubular material of the bag and the second cover sheet to the tubular material of the bag, the second cover sheet is detachable and the first cover sheet is not detachable from the tubular material of the bag. However, there is also the possibility that the first cover sheet, the second cover sheet and the tubular material of the bag are formed from the same material.

In the case of the bag according to the invention, the bag bottom is held together only by the cover sheets applied to the bag bottom. For opening the bag for the removal of material, the second cover sheet is detached according to the invention from the bag bottom, whereby, in the second region, an opening within the bag bottom can be pulled apart and material can thus be removed from the bag. For pulling apart the opening, it is normally enough to detach the second cover sheet. However, depending on the tubular material and the adhesive or, respectively, the welding method which is used, it may happen that the opening is not pulled apart when the second cover sheet is detached and the sections of the bag still partially stick together. However, for releasing this adhesion between the sections, it suffices to rotate the bag such that the loose material will press against the sections as a result of gravity and the adhesion between the sections will be broken by the loose material before loose material pours out of the bag. The first region of the bag bottom continues to be held together by the first cover sheet in an unchanged manner.

As a result, in the case of the bag according to the invention, a pointed item, such as a knife or similar tools, is not necessary for removing the content material from the bag. By designing the bag in accordance with the invention, the advantage is furthermore obtained that a size of the opening is alterable by varying the size of the first and the second region or, respectively, of the first and the second cover sheet. Thus, for a bag for containing a rather large, loose material, such as walnuts or stones, the size or, respectively, the dimension of the second cover sheet is, for example, chosen to be larger than for a bag for containing coffee beans or gravel. An optimum size of the opening can thus be specified depending on the loose material, and loose material can be dispensed from the bag in a metered fashion.

The sections of the tubular material that are folded to form the bag bottom preferably have at least two lugs which overlap one another at least in sections, abut each other and are held in position by the first and the second cover sheets. Advantageously, the lugs of the bag bottom are not or essentially not interconnected. In this context, essentially means that the sections can be adhered to one another for example by means of glue dots in order to render the folding of the bag bottom easier. Upon removal of the second cover sheet, the lugs in the second region can be pulled apart to form an opening, whereby the loose material can be discharged from the bag. A bag bottom with two lugs which overlap each other at least in sections is provided, for example, if the bag bottom is a cross bottom. As a result, the advantage is obtained that a very stable bag with a large volume can be formed, which nevertheless can be opened very easily and quickly according to the invention without a knife or a tool. Advantageously, the first and the second cover sheets are formed in an essentially rectangular shape if the bag bottom is a cross bottom.

Suitably, after the removal of the second cover sheet, the region of the bag bottom reinforced by the first cover sheet is configured as a handle for holding the bag in that the region between the lugs is available for access. This entails the advantage that the bag is very easy to handle without any additional handholds or similar elements being provided and, when loose material is dispensed from the bag, dosing can be controlled better. Advantageously, for dispensing loose material from a box bag in which both open ends are folded to form a bag bottom, the bag is gripped with one hand at the handle formed by the first cover sheet and is held and entwined by the other hand.

Advantageously, the first region and the second region of the bag bottom overlap, with the second cover sheet overlying the first cover sheet especially in a loose fashion. As a result, the advantage is obtained that material is reliably prevented from leaking through gaps or cracks between the cover sheets.

In a bag bottom formed by a cross bottom, a bottom surface of the bag bottom is formed by folding substantially via the lugs and via two triangular areas, each of them formed opposite to each other longitudinally on the bottom surface and having essentially the shape of a triangle. Experiments on bag bottoms formed with cross bottoms have shown that the second cover sheet can be detached with greater ease in a triangular area of the bottom surface than in the area of the lugs of the bottom surface. If the second cover sheet in the triangular area is detached from the bag bottom, starting in the longitudinal direction of the bottom surface, the second cover sheet can indeed be detached very easily in the triangular area, but, due to the better adhesion of the second cover sheet to the bag bottom in the area of the lugs, edges of the lugs will fray or be pulled out or, respectively, be torn off at the transition between the triangular area and the area of the lugs of the bottom surface. This may cause contamination of the loose material, which is not desired. Preferably, the second cover sheet is detached from the bag bottom, from the superimposed area of the cover sheets, starting in the longitudinal direction of the bottom surface. In this case, a higher force is indeed required at the start of the detachment, but the edges are reliably prevented from fraying or being pulled out or, respectively, being torn off at the transition between the triangular area and the area of the lugs of the bottom surface, since the force is distributed more evenly over a width of the bag bottom. The fact that the edges will not fray or be pulled out or, respectively, be torn off anymore also prevents contamination of the loose material during its removal from the bag.

Advantageously, a region of the second cover sheet overlying the first cover sheet is designed as a holding element for removing the second cover sheet. In this way, handling of the bag is made even easier.

In the case of the bag according to the invention, a grammage of the second cover sheet preferably differs from a grammage of the tubular material and/or the first cover sheet. Specifically, the grammage of the second cover sheet is advantageously higher than a grammage of the tubular material and/or the first cover sheet. Due to the higher grammage, the second cover sheet exhibits a higher stiffness than the tubular material and/or the first cover sheet.

With a first cover sheet and/or a second cover sheet and/or a tubular material made of a fabric, a tape density of the fabric of the second cover sheet suitably differs from the tape density of the fabric of the tubular material of the bag and/or the first cover sheet. Specifically, the tape density of the fabric of the second cover sheet is advantageously higher than a tape density of the fabric of the tubular material of the bag and/or the first cover sheet. Due to the higher tape density, the stiffness of the second cover sheet is increased.

Due to the higher stiffness of the second cover sheet, a force acting on the tubular material of the bag is distributed better over the width of the bag bottom during the detachment of the second cover sheet. As a consequence, a force acting on each section of the bag bottom is reduced when the second cover sheet is detached, and the second cover sheet can be detached/pulled off from the bag bottom with greater ease and uniformity. This is particularly advantageous for a tubular material formed by a fabric, as tapes may be pulled out of the bag bottom if the forces acting on sections of the bag bottom are too high. By a small force acting on the tapes, it is reliably prevented that individual tapes are pulled out or edges of the lugs fray when the second cover sheet is detached from the fabric.

The method according to the invention of producing a bag according to the invention for loose material comprises the following steps:
  folding sections of at least one open end of the tubular material to form a bag bottom;
  applying a first cover sheet onto a first region of the bag bottom for reinforcing the bag bottom; and
  applying a second cover sheet in a second region of the bag bottom, wherein the cover sheets hold the folded sections of the tubular material together in such a way that the bag bottom is sealed.

Using the method according to the invention, a bag according to the invention having the features as initially mentioned can be produced. The method can be performed either manually or automatically by means of the device according to the invention.

The device according to the invention for producing a bag according to the invention from a tubular material formed by a tubular planar assembly or a flat material connected to form a tube comprises a conveying device for transporting the tubular material in the conveying direction, the tubular material of the bag lying flatly on the conveying device with the open ends transversely to the conveying direction, at least one bottom folding unit, which is designed for folding at least one end of the tubular material to form a bag bottom, a first cover sheet application unit, which is designed for applying the first cover sheet in the first region of the bag bottom, and a second cover sheet application unit, which is designed for applying the second cover sheet in the second region of the bag bottom.

Using the device according to the invention, a bag according to the invention having the features as initially mentioned can be produced. Advantageously, the bottom folding unit is formed by a pulling-apart unit and a folding unit, which may be designed as a unit, but may also be designed separately from each other. A technical construction of the pulling-apart unit, the folding unit and the cover sheet application unit will not be described any further herein, since it is generally known. See, for example, EP 2 441 574 B1 and EP 2 711 164 B1.

Further advantageous embodiment variants of the bag according to the invention and of the device according to the invention will be explained in further detail hereinbelow on the basis of the figures.

FIGS. 2 to 5 show the bag according to the invention, which has been produced with the device according to FIG. 1, in various schematic illustrations.

Figure 7:
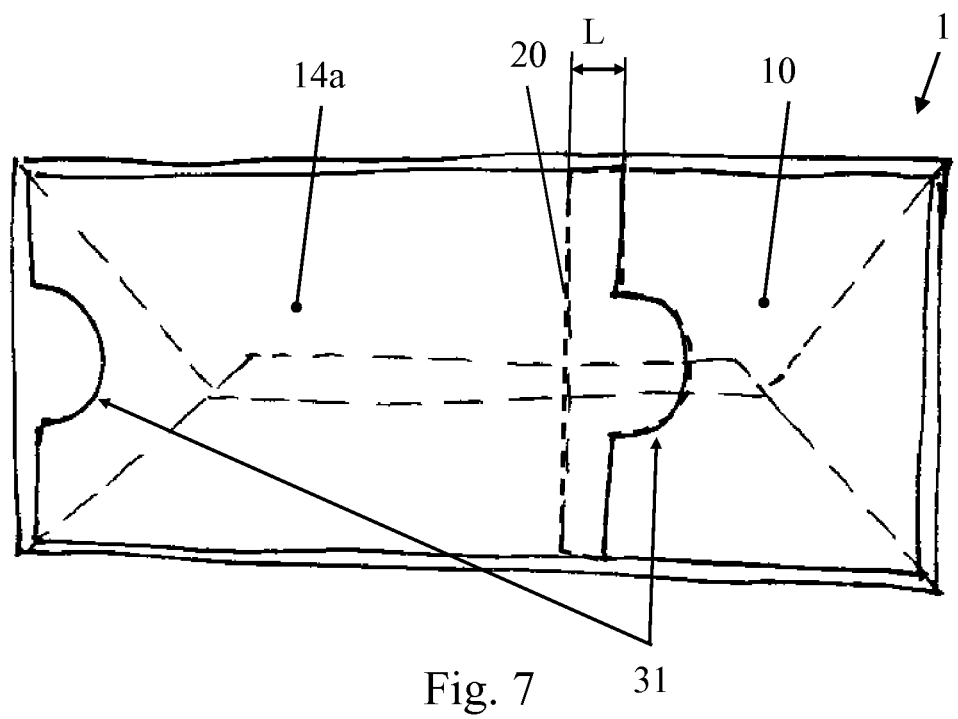
Figure 8:
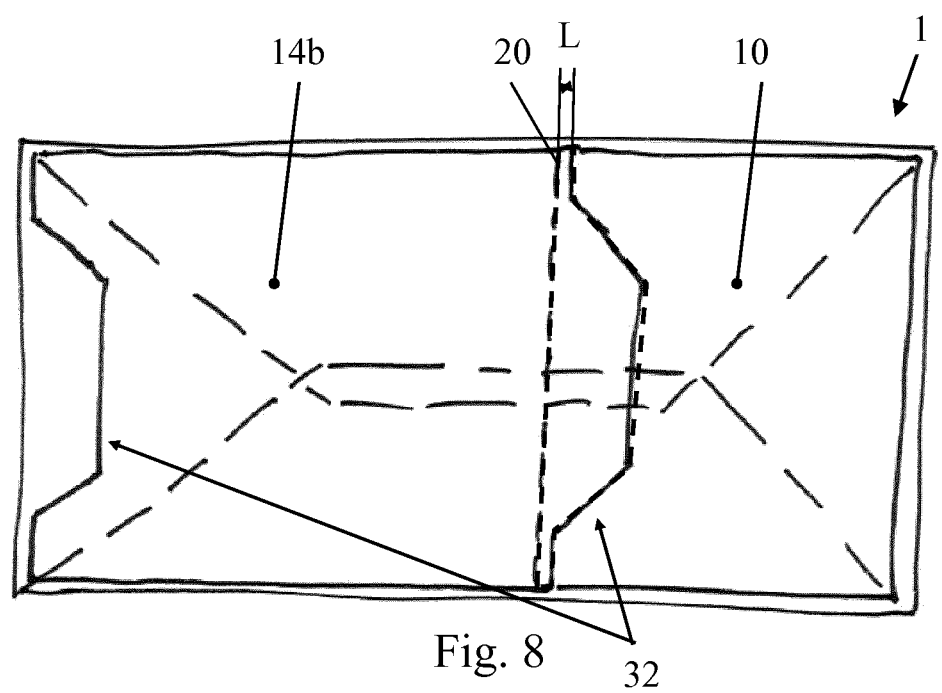

FIGS. 7 and 8 each show a bag according to the invention as per FIG. 2 in a schematic view from above with differently shaped second cover sheets.

Figure 1:
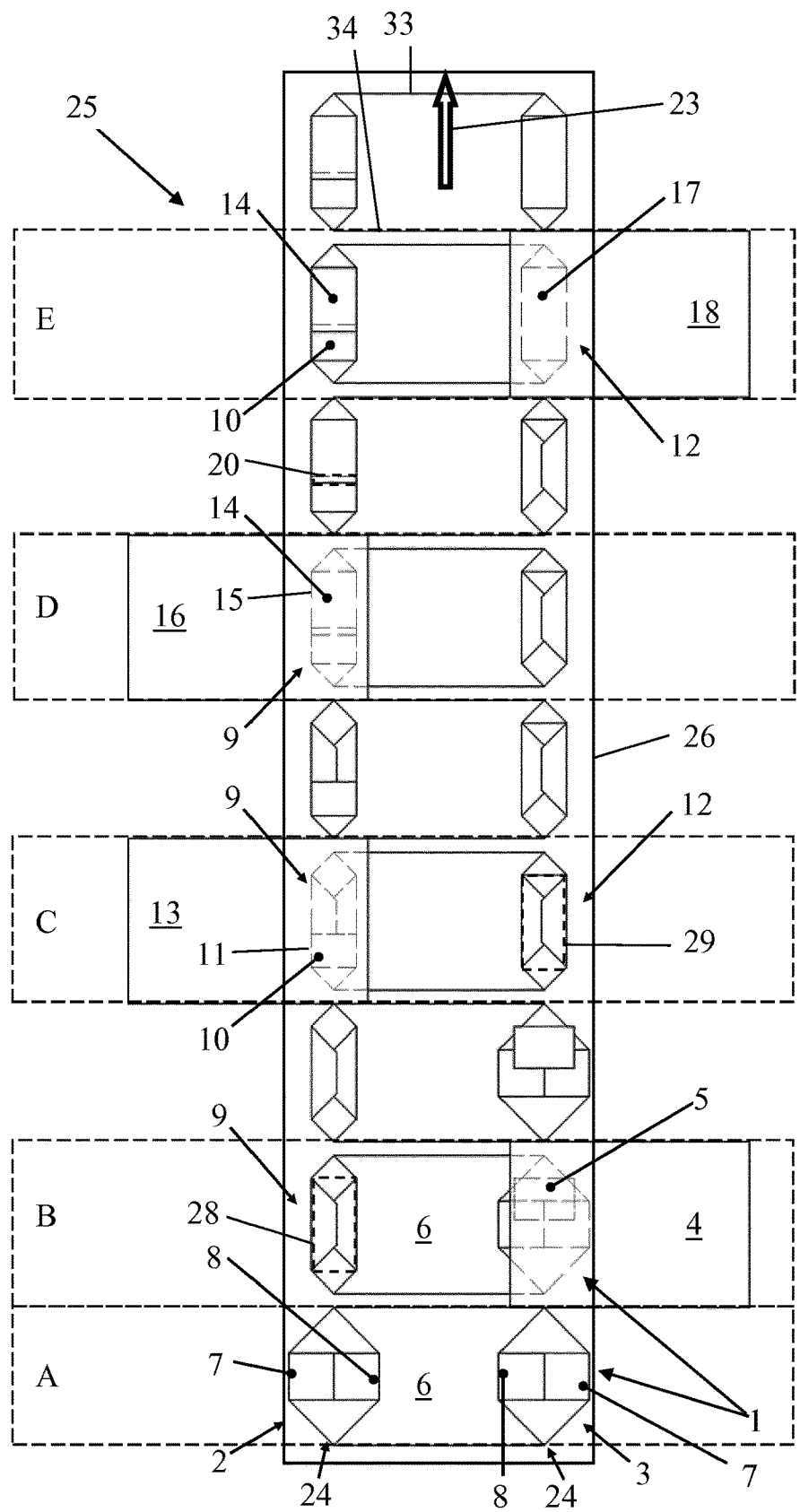
FIG. 1 shows a first embodiment variant of a device for producing an embodiment variant of a bag according to the invention in a schematic illustration.

FIG. 1 shows a first embodiment variant of a device 25 for producing an embodiment variant of a bag 1 according to the invention in a schematic illustration. Furthermore, FIG. 1 shows individual steps A to E, which are carried out by the device 25 for producing the bag 1 according to the invention. The steps A to E are performed on each bag 1.

The device 25 comprises a conveying device 26 for transporting the bags 1 in the conveying direction 23, a bottom folding unit, which is not illustrated, a valve patch application unit 4, a first cover sheet application unit 13, a second cover sheet application unit 16 and a third cover sheet application unit 18.

In FIG. 1, nine bags 1 are shown in different production stages, wherein the bags 1 are conveyed by the conveying device 26 from step to step. Each bag 1 is formed from a tubular material which is a tubular planar assembly in the form of a circular-woven fabric 6, with the circular-woven fabric 6 having a first open end 2 and a second open end 3. Such a tubular circular-woven fabric 6 is produced, for example, in circular looms. However, there is also the possibility that the bag 1 is formed by a flat fabric connected to form a tube. In this case, the flat fabric is advantageously welded, glued or sewn to form a tube. The circular-woven fabric 6—hereinafter referred to as fabric 6—lies flatly on the conveying device 26 with the open ends 2 and 3 transversely to the conveying direction 23. However, there is also the possibility that the tubular material is formed from paper, a nonwoven or a film.

For the production of the bag 1 according to the invention, the following steps A to E are performed:

A: pulling apart the first open end 2 and the second open end 3 and folding over sections 24 of the fabric 6, forming lugs 7 and 8, by the bottom folding unit;

B: inserting a valve patch 5 into the second open end 3 and welding or gluing the valve patch 5 to the fabric 6 of the bag 1 by the valve patch application unit 4, and folding the lugs 7 and 8 of the first open end 2 by the bottom folding unit to form a first bag bottom 9 configured as a cross bottom, wherein the two lugs 7 and 8 overlap and abut each other in sections and wherein a first bottom surface 28 is formed;

C: applying a first cover sheet 10 in a first region 11 of the first bag bottom 9 by the first cover sheet application unit 13, wherein the first cover sheet 10 is advantageously glued or welded inseparably to the fabric 6 of the first bag bottom 9 by the first cover sheet application unit 13, and folding the lugs 7 and 8 of the second open end 3 by the bottom folding unit to form a second bag bottom 12 configured as a cross bottom, wherein the two lugs 7 and 8 overlap and abut each other in sections and wherein a second bottom surface 29 is formed;

D: applying a second cover sheet 14 in a second region 15 of the first bag bottom 9 by the second cover sheet application unit 16, wherein the first region 11 and the second region 15 overlap and the second cover sheet 14 loosely overlies the first cover sheet 10 at least in sections, forming an overlying region 20, and wherein the second cover sheet 14 is glued or welded to the fabric 6 of the first bag bottom 9 by the second cover sheet application unit 16 in such a way that it can be disengaged by applying an appropriate force; and E: applying a third cover sheet 17 to the second bag bottom 12 by the third cover sheet application unit 18, wherein the third cover sheet 17 is advantageously glued or welded inseparably to the second bag bottom 12 by the third cover sheet application unit 18.

In this connection, it should also be noted that the bottom folding unit is formed by two pulling-apart units and two folding units, wherein, for the sake of simplicity, the bottom folding unit is considered as one unit in the above explanation of the individual steps. A pulling-apart unit is known, for example, from EP 2 711 164 B1. The folding unit is formed, for example, by simple brackets, which fold up the lugs 7 and 8 during the transport of the bag 1 on the conveying device 26.

In a further embodiment variant, there is also the possibility that the above-indicated steps are performed manually.

FIGS. 2 to 5 show the bag 1 according to the invention, which has been produced with the device 25 according to FIG. 1, in various illustrations, wherein the bag 1 has already been filled with a loose material 19 at the valve patch 5. As can be seen clearly in FIG. 1, the bottom surfaces 28 and 29 are, in each case, formed by the lugs 7 and 8, which overlap each other, and by two triangular areas 30, each of them formed opposite to each other longitudinally on the bottom surfaces 28 and 29 and having essentially the shape of a triangle.

An opening of the bag 1 and a removal of loose material 19 from the bag 1 will now be described in further detail hereinbelow. In a first step, the region 20 of the second cover sheet 14 which loosely overlies the first cover sheet 10 at least in sections is bent upwards, whereby the overlying region 20 forms a holding element which can be gripped easily and via which the second cover sheet 14 can be detached from the fabric 6 by peeling stress. In this context, loosely at least in sections means that the second cover sheet 14 can be glued or welded to the first cover sheet 10 also in sections, but advantageously the second cover sheet 14 rests completely loosely on the first cover sheet 10. In this connection, see FIGS. 2 and 3. The overlying region 20 can optionally have a contour cut 31 or 32, as a result of which the overlying region 20 is designed particularly ergonomically and thus can be gripped with even greater ease. See FIGS. 7 and 8.

By detaching the second cover sheet 14, the lugs 7 and 8 are pulled apart in the second region 15 to form an opening 21. Now, the bag 1 can be positioned by gripping it in the area between the lugs 7 and 8 and holding the first cover sheet 10 in such a way that the loose material 19 can be discharged from the bag 1 through the opening 21. Depending on the adhesion of the second cover sheet 14 to the lugs 7 and 8 and depending on the elasticity of the material, there is the possibility that the opening 21 is not automatically pulled apart simultaneously with the detachment of the second cover sheet 14. In this case, the opening 21 is pulled apart by the loose material 19 itself as a result of gravity only because the bag 1 has been repositioned, which is necessary for removing loose material 19 from the bag 1.

In the case of the bag 1 according to the invention, it is not necessary to slice the bag 1 open for removing loose material 19.

Figure 6:
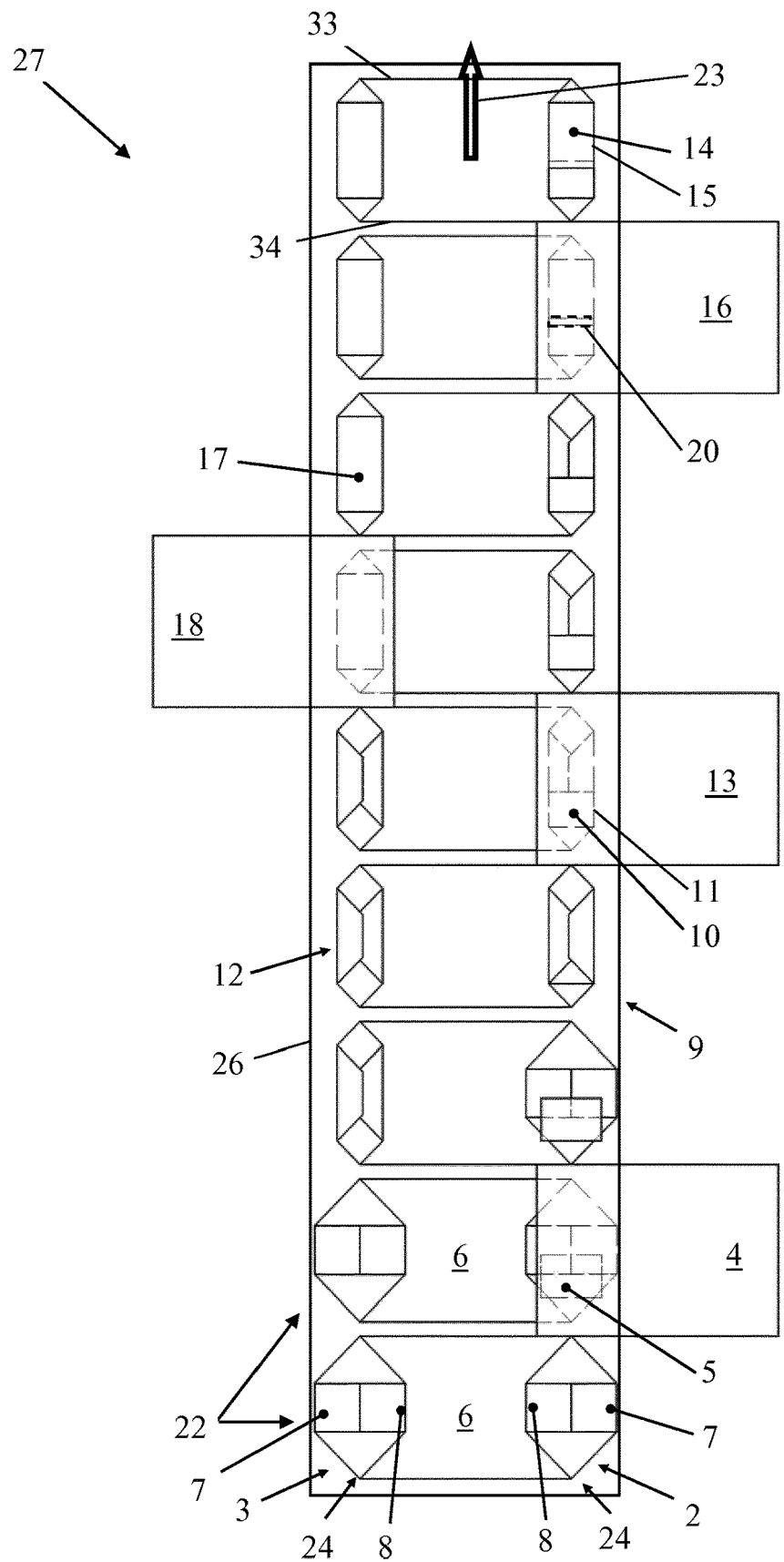
FIG. 6 shows a further embodiment variant of a device for producing an embodiment variant of a bag according to the invention in a schematic illustration.

FIG. 6 shows a further embodiment variant of a device 27 for producing an embodiment variant of a bag 22 according to the invention in a schematic illustration. Elements and parts of the device 27 which are the same as or similar to elements and parts of the device 25 according to FIG. 1 are provided with the same reference numerals. Elements, parts and regions of the bag 22 which are the same as or similar to elements, parts and regions of the bag 1 according to FIGS. 1 to 5 are provided with the same reference numerals.

The bag 22 according to the invention differs from the bag 1 according to the invention only in that, in the bag 22 according to the invention, the valve patch 5 is introduced into the first bag bottom 9. Furthermore, the production of the bag 22 differs from the production of the bag 1 in that, during the production of the bag 22, the third cover sheet 17 is applied to the second bag bottom 12 before the second cover sheet 14 is applied to the first bag bottom 9. As a consequence, the third cover sheet application unit 18 in the device 27 is arranged in the conveying direction 23 in front of the second cover sheet application unit 16.

It should also be noted in this regard that the processing of the first and the second bag bottoms 9 and 12 can also occur in a different order, wherein the first cover sheet 10 has to be applied prior to the second cover sheet 14 for implementing an overlying region 24. In this regard, there is also the possibility, for example, that the first cover sheet 10 and the third cover sheet 17 or the second cover sheet 14 and the third cover sheet 17 are applied simultaneously to the respective bag bottoms 9 and 12. It is also possible that the lugs 7 and 8 of the respective ends 2 and 3 are folded up simultaneously to form the respective bag bottom 9 or 12. Furthermore, there is the possibility that the formation of the first bag bottom 9 and of the second bag bottom 12 occurs completely separately in each case.

FIGS. 7 and 8 show a bag 1 according to the invention as per FIG. 2 in a schematic view from above with differently shaped second cover sheets 14a and 14b of the bag 1. The second cover sheet 14a has a round contour cut 31 at two ends, whereby the overlying region 20 is extended and can thus be gripped with greater ease. The second cover sheet 14b has a trapezoidal contour cut 32 instead of a round contour cut 31. Advantageously, a length L of the overlying region 20 is chosen such that the overlying region 20 can be gripped easily. Accordingly, the length L can be chosen differently, depending on the contour cut 31 or 32.

It should also be noted that a position of the first region 11 and the second region 12 can also be swapped during the production of the bag 1 or the bag 22, whereby the first cover sheet 10 is applied closer to an edge 33 of the bag 1, 22 which is located at the front in the conveying direction 23 and the second cover sheet 14 is applied closer to an edge 34 of the bag 1, 22 which is located at the rear in the conveying direction 23.

The invention claimed is:

1. A bag for loose material, wherein the bag is formed from a tubular material, which tubular material is a tubular planar assembly or a flat material connected to form a tube, is formed by a fabric, a nonwoven, a film or paper and has a first open end and a second open end opposite each other, wherein sections of the tubular material of at least one of the open ends are shaped by folding to form a bag bottom, wherein the bag bottom exhibits a first cover sheet, which is designed for reinforcing the bag bottom, wherein the bag bottom has a second cover sheet resting loosely on the first cover sheet, wherein the first cover sheet is connected to the bag bottom and extends in a first region of the bag bottom and wherein the second cover sheet is detachably connected to the bag bottom and extends in a second region of the bag bottom, whereby, via the first cover sheet and the second cover sheet, the folded sections of the tubular material are held together in such a way that the bag bottom is sealed, wherein the sections of the tubular material that are folded to form the bag bottom have at least two lugs which overlap one another at least in sections, abut each other, and are held in position by the first and the second cover sheets, and wherein, upon complete removal of the second cover sheet, pulling apart of only the lugs in the second region an opening is formed such that the loose material can be discharged from the bag.

2. A bag according to claim 1, wherein, after the removal of the second cover sheet, the first region of the bag bottom reinforced by the first cover sheet is configured as a handle for holding the bag in that the first region between the lugs is available for access.

3. A bag according to claim 1, wherein the first region and the second region of the bag bottom overlap, with the second cover sheet overlying the first cover sheet.

4. A bag according to claim 3, wherein a region of the second cover sheet overlying the first cover sheet is designed as a holding element for removing the second cover sheet.

5. A bag according to claim 1, wherein a material of the second cover sheet differs from a material of the first cover sheet and/or from the tubular material of the bag.

6. A bag according to claim 1, wherein a grammage of the second cover sheet differs from a grammage of the tubular material and/or the first cover sheet.

7. A bag according to claim 1, wherein a grammage of the second cover sheet is higher than a grammage of the tubular material and/or the first cover sheet.

8. A bag according to claim 1, wherein the first cover sheet and/or the second cover sheet and/or the tubular material is/are formed by a fabric, wherein a tape density of the fabric of the second cover sheet differs from the tape density of the fabric of the bag and/or the first cover sheet.

9. A bag according to claim 1, wherein the first cover sheet and/or the second cover sheet and/or the tubular material is/are formed by a fabric, wherein a tape density of the fabric of the second cover sheet is higher than a tape density of the fabric of the bag and/or the first cover sheet.

10. A bag according to claim 1, wherein the bag bottom is a cross bottom and the first cover sheet and/or the second cover sheet has/have an essentially rectangular shape.

11. A bag according to claim 1, wherein the second cover sheet has at least one contour cut.

* * * * *